(12) United States Patent
Hodge

(10) Patent No.: US 10,488,603 B2
(45) Date of Patent: Nov. 26, 2019

(54) WAVEGUIDE ALIGNMENT STRUCTURE

(71) Applicant: Molex, LLC, Lisle, IL (US)

(72) Inventor: Malcolm H. Hodge, Chicago, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/078,713

(22) PCT Filed: Feb. 24, 2017

(86) PCT No.: PCT/US2017/019325
§ 371 (c)(1),
(2) Date: Aug. 22, 2018

(87) PCT Pub. No.: WO2017/147401
PCT Pub. Date: Aug. 31, 2017

(65) Prior Publication Data
US 2019/0086617 A1    Mar. 21, 2019

Related U.S. Application Data

(60) Provisional application No. 62/299,810, filed on Feb. 25, 2016.

(51) Int. Cl.
*G02B 6/38* (2006.01)
(52) U.S. Cl.
CPC ......... *G02B 6/3885* (2013.01); *G02B 6/3825* (2013.01); *G02B 6/3834* (2013.01); *G02B 6/3841* (2013.01); *G02B 6/3861* (2013.01)
(58) Field of Classification Search
CPC .. G02B 6/3825; G02B 6/3841; G02B 6/3861; G02B 6/3885; G02B 6/3834
(Continued)

(56) References Cited

U.S. PATENT DOCUMENTS 4,943,136 A   7/1990  Popoff
5,394,495 A * 2/1995  Booth ............... G02B 6/3846
                                                          385/49
(Continued)

FOREIGN PATENT DOCUMENTS

CN        1522379 A    8/2004
CN      101485038 A    7/2009
(Continued)

OTHER PUBLICATIONS

Office Action received for Japanese application No. 2018-544052, dated Jul. 30, 2019, 9 pages. (4 pages of English translation and 5 pages of official copy).

*Primary Examiner* — Michael P Mooney
(74) *Attorney, Agent, or Firm* — Molex, LLC

(57) ABSTRACT

A multi-tiered optical assembly includes a ferrule body having a mating face, a rear face, and a pair of spaced apart sidewalls, with the mating face, the rear face, and the sidewalls defining an opening. The ferrule body further includes a first support level, and a second support level, with the second support level being vertically spaced from the first support level. First and second flexible optical waveguide members each include at least one waveguide. The first waveguide member is disposed at the first support level and extends between the mating face and the rear face, and the second waveguide member is disposed at the second support level and extends between the mating face and the rear face.

20 Claims, 12 Drawing Sheets

(58) Field of Classification Search
USPC .................................................. 385/53–87
See application file for complete search history.

(56) References Cited

U.S. PATENT DOCUMENTS

| | | | |
|---|---|---|---|
| 6,817,777 B1 * | 11/2004 | Grabbe | G02B 6/3882 |
| | | | 385/53 |
| 2003/0031409 A1 | 2/2003 | Bellman et al. | |
| 2003/0174970 A1 | 9/2003 | Chan et al. | |
| 2011/0317969 A1 * | 12/2011 | Dangel | G02B 6/3885 |
| | | | 385/114 |
| 2012/0014649 A1 * | 1/2012 | Duis | G02B 6/3652 |
| | | | 385/65 |
| 2012/0141071 A1 | 6/2012 | Duis et al. | |
| 2013/0136399 A1 | 5/2013 | Jubin et al. | |
| 2014/0147083 A1 | 5/2014 | Nakagawa et al. | |
| 2015/0266248 A1 | 9/2015 | Numata et al. | |

FOREIGN PATENT DOCUMENTS

| | | |
|---|---|---|
| CN | 202583506 U | 12/2012 |
| CN | 103415797 A | 11/2013 |
| CN | 103620461 A | 3/2014 |
| JP | 2000-275463 A | 10/2000 |
| JP | 2011-017933 A | 1/2011 |
| JP | 2015-138228 A | 7/2015 |

\* cited by examiner

WAVEGUIDE ALIGNMENT STRUCTURE

RELATED APPLICATIONS

This patent application is a national stage of International Application No. PCT/US2017/019325, filed Feb. 24, 2017, which claims priority to U.S. Provisional Patent Application 62/299,810, entitled "WAVEGUIDE ALIGNMENT STRUCTURE," which was filed on Feb. 25, 2016, both of which are incorporated here by reference in their entirety.

TECHNICAL FIELD

This disclosure relates generally to optical interconnections and, more particularly, to a module and tool for and method of terminating a plurality of vertically aligned optical waveguide tabs.

BACKGROUND

Optical circuits are used to interconnect optical components within electronic and other high-speed and/or high-bandwidth systems. In some applications, optical circuits are formed on a planar substrate with a plurality of optical waveguides as a flexible optical waveguide member.

The optical waveguide members may include tabs for termination to other optical components. In some instances, it may be desirable to terminate a plurality of vertically aligned tabs. Interconnections between planar optical circuit members and other components have proven to be relatively complex and time-consuming. The waveguides of the planar optical circuit members must be precisely aligned with optical elements of mating components in order to create and optically efficient connection. A simple and cost-effective manner of interconnecting waveguides of a planar optical circuit member to optical elements of a mating component would be useful.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a multi-tiered optical assembly includes a ferrule body having a mating face, a rear face, and a pair of spaced apart sidewalls, with the mating face, the rear face, and the sidewalls defining an opening. The ferrule body further includes a first support level, and a second support level, with the second support level being vertically spaced from the first support level. First and second flexible optical waveguide members each include at least one waveguide. The first waveguide member is disposed at the first support level and extends between the mating face and the rear face, and the second waveguide member is disposed at the second support level and extends between the mating face and the rear face.

In another aspect, a method of forming a multi-tiered optical assembly includes providing a ferrule body having a mating face, a rear face, and a pair of spaced apart sidewalk, with the mating face, the rear face, and the sidewalls defining an opening. The ferrule body further including a first support level and a second support level, with the second support level being vertically spaced from the first support level and vertically spaced from the lower surface of the opening. The method further includes providing first and second flexible optical waveguide members, with each waveguide member including at least one waveguide, positioning the first waveguide member at the first support level and between the mating face and the rear face, and positioning the second waveguide member at the second support level and between the mating face and the rear face. The method also includes engaging the first waveguide member adjacent the mating edge thereof to align the at least one waveguide of the first waveguide member relative to the mating face of the ferrule body, engaging the second waveguide member adjacent the mating edge thereof to align the at least one waveguide of the second waveguide member relative to the mating face of the ferrule body, and securing the first waveguide member and the second waveguide member to the ferrule body.

In still another aspect, a multi-tiered optical assembly includes a ferrule body having a mating face, a rear face, and a pair of spaced apart stepped sidewalls, with the mating face, the rear face, and the sidewalls defining an opening. The ferrule body further includes a first support level having a pair of spaced apart first side surface portions with the first side surface portions being a first distance apart, and a second support level having a pair of spaced apart second side surface portions, with the second side surface portions being a second distance apart. The second distance is greater than the first distance and the second support level is vertically spaced from the first support level. A first flexible optical waveguide member has a first mating edge and a first width and includes at least one first waveguide. The first waveguide member is disposed at the first support level with the first mating edge of the first waveguide member being disposed generally adjacent the mating face of the ferrule body. A second flexible optical waveguide member has a second mating edge and a second width wider than the first width and includes at least one second waveguide. The second waveguide member is disposed at the second support level with the second mating edge of the second waveguide member being disposed generally adjacent the mating face of the ferrule body.

DETAILED DESCRIPTION

Figure 1:
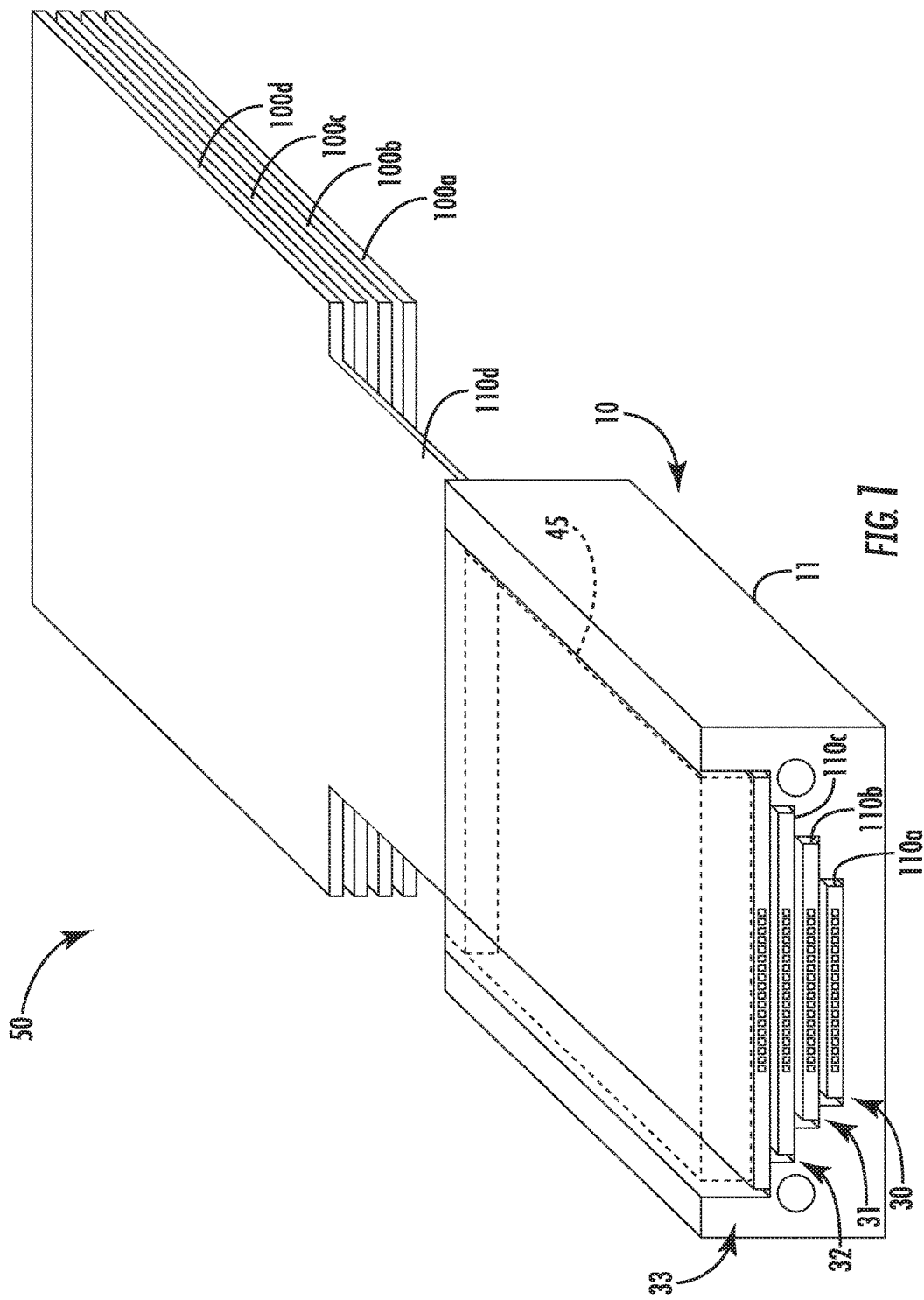
FIG. 1 is a perspective view of a multi-tiered optical assembly.
Figure 2:
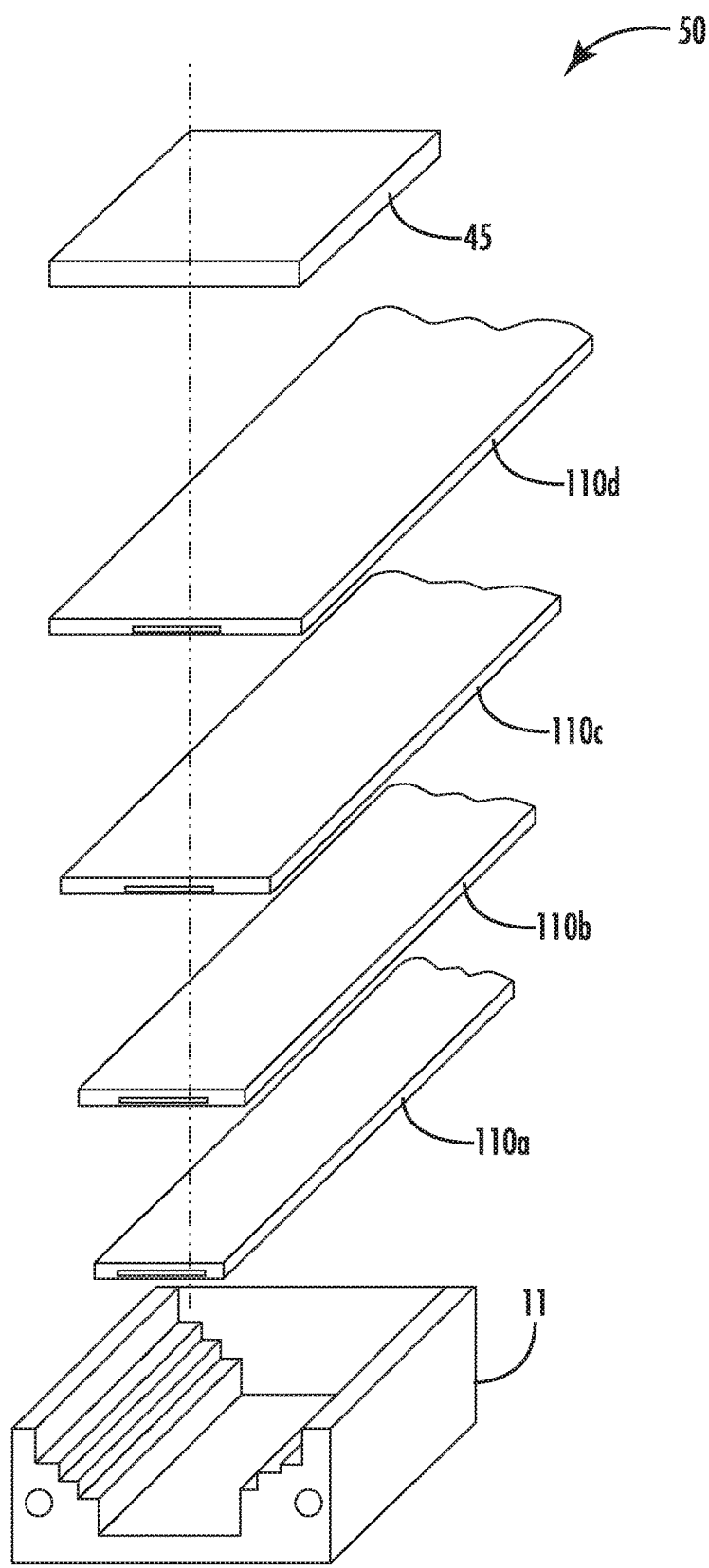
FIG. 2 is an exploded perspective view of a portion of the optical assembly of FIG. 1.

Referring to FIGS. 1-2, an array of aligned tabs 110a-110d of a plurality of flexible optical waveguide members 100a-100d are mounted or disposed on a module or ferrule 10 to form a multi-tiered optical assembly 50. Each flexible optical waveguide member 100 (FIG. 3) includes a base material or substrate 102. A layer of cladding 103 may be applied to the substrate 102 and one or more optical waveguides 104 are formed on the cladding layer. If desired, additional cladding 103 may be applied to the existing cladding layer and the waveguides 104 so that the cladding fully surrounds the waveguides. The index of refraction of the waveguides 104 is higher than that of the cladding 103. The substrate 102, the cladding 103, and the waveguides 104 may be formed of any desired materials and in any desired manner including those in which the optical waveguide member 100 is flexible. In one embodiment, the substrate 102, the cladding 103, and the waveguides 104 may be formed of a resin or polymer material.

Figure 3:
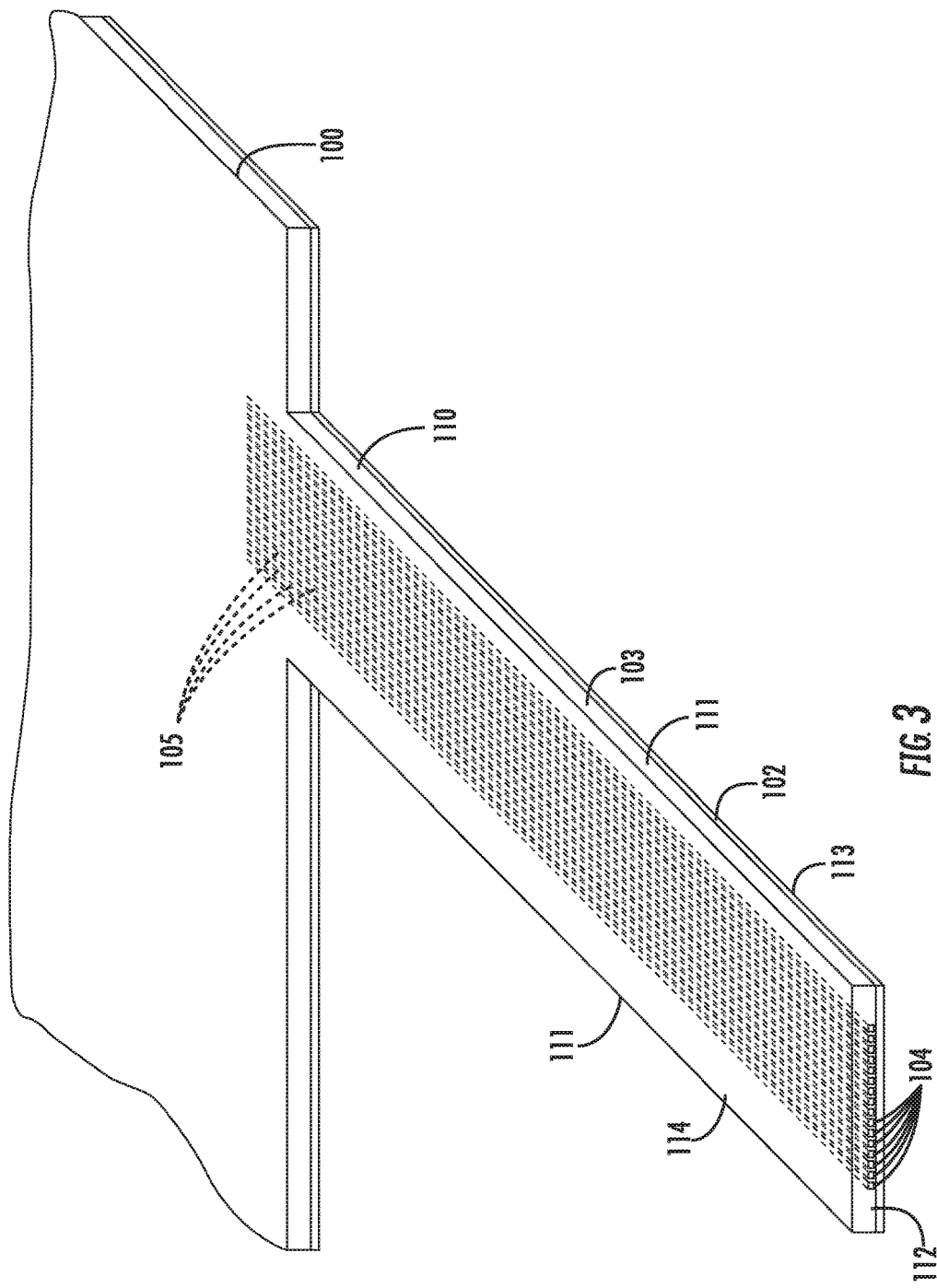
FIG. 3 is an enlarged perspective view of a tab of an optical waveguide member of the optical assembly of FIG. 1.

To facilitate termination of the waveguides 104, the optical waveguide member 100 may be formed with one or more tabs or relatively narrow extensions 110 (FIG. 3). Each tab 110 has oppositely facing sidewalls 111 and a mating edge 112 that extends between the sidewalls 111. The lower surface of the substrate 102 defines the lower surface 113 of the tab 110. An upper surface 114 is opposite the lower surface 113. Waveguides 104 extend within or along the tab 110 of the optical waveguide member 100 from the mating edge 112 as depicted by hidden lines 105 in FIG. 3 and, though not shown, extend throughout the optical waveguide member as desired. As depicted, the waveguides 104 are closer to the substrate 102 and lower surface 113 than to the upper surface 114. In other embodiments, the waveguides 104 may be positioned closer to the upper surface 114 or centrally located within the tab 110.

Referring back to FIGS. 1-2, the tabs 110 of the array are progressively narrower from top to bottom. More specifically, the lower tab 110a has the smallest distance between its sidewalls 111 and the upper tab 110d has the greatest distance between its sidewalk 111. The distance between the sidewalls 111 of the lower intermediate tab 110b is greater than that of the lower tab 110a and the distance between the sidewalls 111 of the upper intermediate tab 110c is greater than that of the lower intermediate tab 110b but less than that of the upper tab 110d. Despite the different widths of the tabs 110a-110d, in some embodiments, each tab may have the same number of waveguides 104. The multi-tiered optical assembly 50 may include any number of optical waveguide members 100 and each optical waveguide member may have any number of waveguides 104. In one embodiment, each optical waveguide member 100 may have eighteen waveguides 104 so that the array of four optical waveguide members has a total of seventy-two waveguides.

Figure 4:
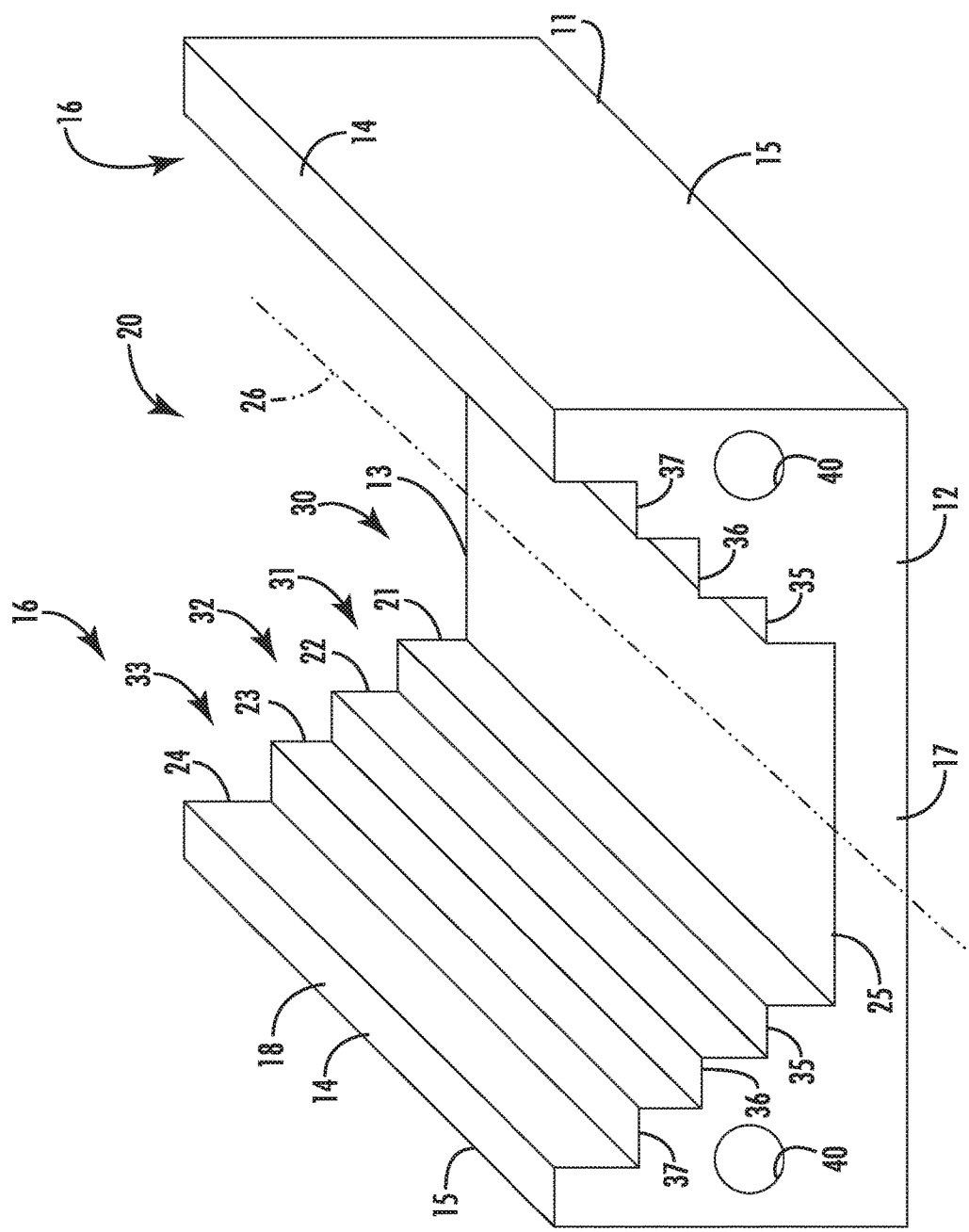
FIG. 4 is an enlarged perspective view of a ferrule body of the multi-tiered optical assembly of FIG. 1.

Ferrule 10 has a one-piece or unitary ferrule body 11 (FIG. 4) and may include a cover 45. The ferrule body 11 as a generally flat front or mating face 12 and a generally flat, oppositely facing rear face 13. Sidewalls 14 extend between the mating face 12 and the rear face 13. Outer surfaces 15 of the sidewalls 14 face in opposite directions. Inner surfaces 16 of sidewalls 14 are stepped and are widest or thickest adjacent the lower surface 17 of the female body 11 and are narrowest adjacent upper surface 18. The inner surfaces 16 of sidewalls 14 define a recess or opening 20 that extends between the inner surfaces and from the mating face 12 to the rear face 13.

Each stepped inner surface 16 include four vertical side surface portions 21-24 with the lower side surface portion 21 adjacent the lower surface 25 of the opening 20 being closest to the longitudinal centerline 26 of the ferrule body 11 and the upper side surface portion 24 adjacent the upper surface 18 of the ferrule body being farthest from the centerline. The distance between the lower side surface portions 21 of the sidewalls 14 is the smallest while the distance between the upper side surface portions 24 of the sidewalls is the greatest. The distance between the lower intermediate side surface portions 22 is greater than the distance between the lower side surface portions 21 and the distance between the upper intermediate side surface portions 23 is greater than the distance between the lower intermediate side surface portions 22 and less than the distance between the upper side surface portions 24.

The opening 20 defines a plurality of support levels 30-33, with each support level being configured to support a tab 110 of an optical waveguide member 100. The lower support level 30 may be defined by the lower surface 25 of opening 20 and is configured to support tab 110a. An upper support level 33 is defined by the upper horizontal support surface 37 of each sidewall 14 and is configured to support tab 110d. The lower intermediate support level 31 is defined by the lower intermediate horizontal support surface 35 of each sidewall 14 and is configured to support tab 110b. The upper intermediate support level 32 is defined by the upper intermediate horizontal support surface 36 of each sidewall 14 and is configured to support tab 110c. If desired, the lower support level 30 may be defined by separate horizontal support surfaces (334 in FIG. 11) that extend above the lower surface 25 of opening 20 so that lower tab 110a is positioned on the lower support level but spaced from the lower surface.

Ferrule body 11 may include a pair of alignment holes or receptacles 40 positioned on opposite sides of the opening 20. As depicted, alignment holes 40 are generally cylindrical and extend from the mating face 12 to the rear face 13. However, in some embodiments, the holes 40 may not have a uniform cross-section but rather may be tapered or stepped, or may have a uniform non-circular cross-section such as a hexagonal shape. The alignment holes 40 are configured to receive a post 220 (FIG. 5) therein to facilitate alignment when mating a pair of optical components.

A cover 45 (depicted in phantom in FIG. 1 for clarity) may be positioned within opening 20 along the upper side surface portions 24 of each sidewall 14 and above the upper horizontal support surfaces 37. The cover 45 is operative to assist in sealing the opening 20 and in securing the tabs 110 within the opening.

The ferrule body 11 may be formed of a resin capable of being injection molded such as polyphenylene sulfide or polyetherimide and may include an additive such as silica (SiO$_2$) to improve the strength and dimensional stability of the resin. Other materials and other manners of forming the ferrule body 11 are contemplated. Cover 45 may be formed of a similar or identical material to that used to form ferrule body 11 or a different material may be used.

During assembly, the mating edges 112 of tabs 110 must be accurately positioned upon their respective support surfaces. More specifically, the mating edge 112, and thus the waveguides 104 of each tab 110, must be precisely positioned in all directions (x, y, and z). To do so, the tabs 110a-110d may be inserted sequentially into the recess 20 from the narrowest tab 110a to the widest tab 110d. The lower tab 110a is disposed at the lower support level 30 with the sidewalls 111a of the lower tab adjacent the lower side surface portions 21, the lower intermediate tab 110b is disposed at the lower intermediate support level 31 with the sidewalls 111b of the lower intermediate tab adjacent the lower intermediate side surface portions 22, the upper intermediate tab 110c is disposed at the upper intermediate support level 32 with the sidewalls 111c of the upper intermediate tab adjacent the upper intermediate side surface portions 23, and the upper 110d is disposed at the upper support level 33 with the sidewalk 111d of the upper tab adjacent the upper side surface portions 24. By positioning the tabs 110a-110d in such a manner, the waveguides 104 of the tabs are generally positioned adjacent the mating face 12 of the ferrule body 11.

Figure 5:
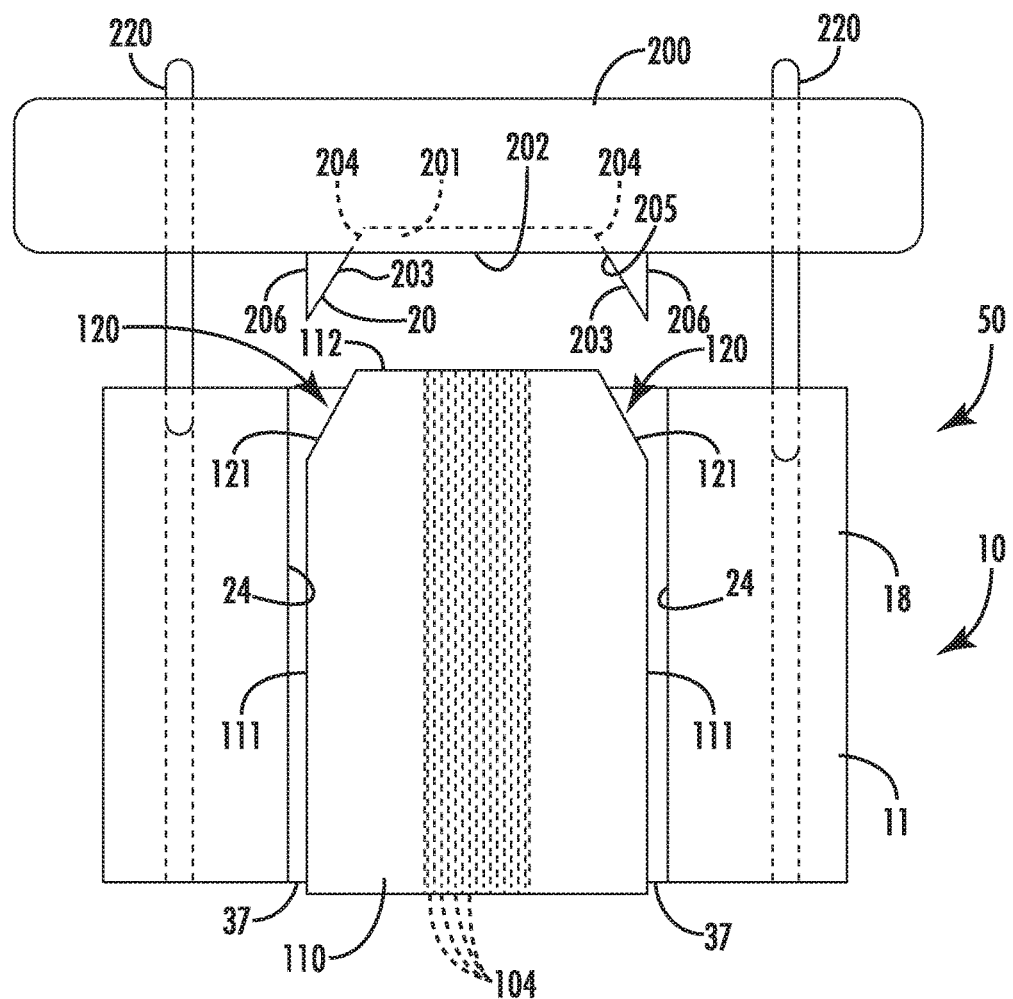
FIG. 5 is a top plan view of a schematic illustration of a multi-tiered optical assembly with an alignment fixture prior to engagement of the optical assembly.
Figure 6:
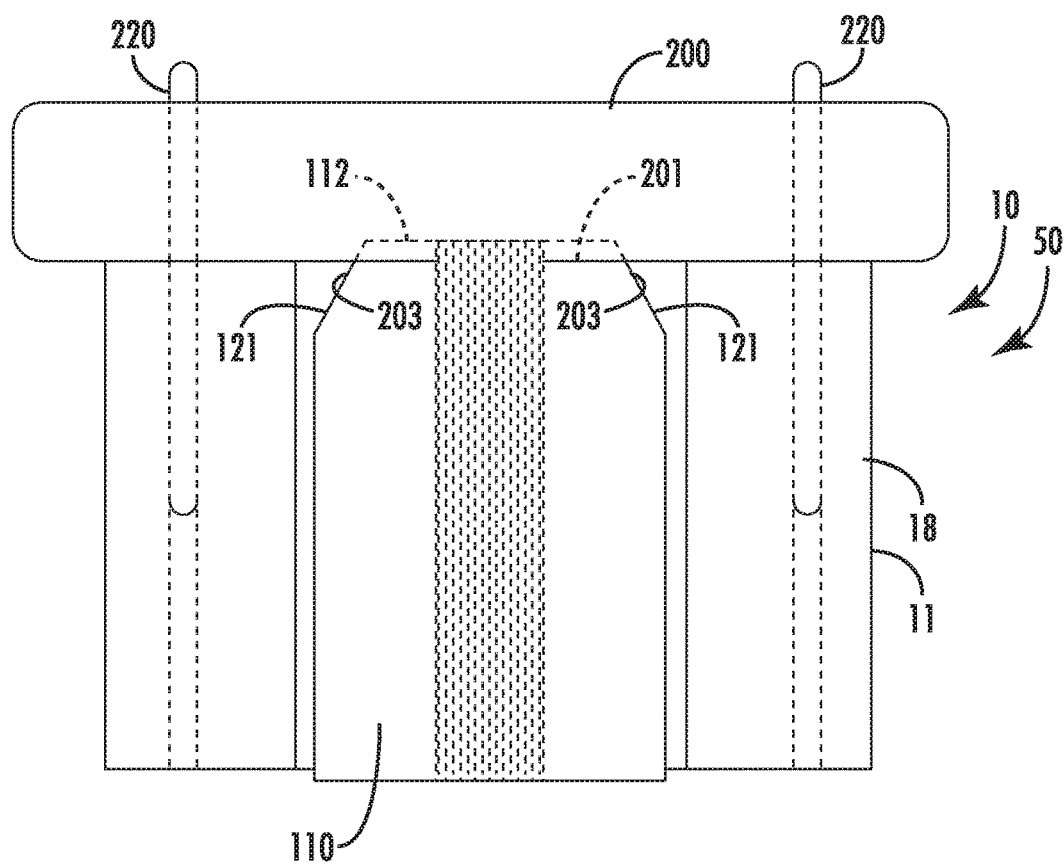
FIG. 6 is a top plan view similar to FIG. 5 but with the alignment fixture engaging the multi-tiered optical assembly.

To more precisely locate the waveguides 104 at the mating face 12 of ferrule body 11, horizontal and vertical alignment structures may be used to precisely position the mating edges 112 of the tabs relative to the mating face 12 of the ferrule body 11. One embodiment of a horizontal alignment structure is depicted in FIGS. 5-6 in which each sidewall 111 of tabs 110 includes a triangular-shaped recess 120 to define an angled horizontal alignment surface 121 that extends outward from the mating edge 112 towards the sidewall 111. A fixture 200 may be aligned with the mating face 12 of the ferrule body 11.

The fixture 200 may include a horizontal recess 201 that extends along the alignment face 202 of the fixture and is generally aligned with the mating edge 112 of each tab 110. An angled surface 203 is defined by the lateral edges 204 of each recess 201 and the inner surfaces 205 of projections 206 that are adjacent the lateral edges. The angled alignment surfaces 121 of each tab 110 interact with the angled surfaces 203 of the fixture 200 to laterally or horizontally align the tabs relative to the ferrule body 11.

The fixture 200 may further include a vertical waveguide alignment structure 210 along the alignment face 202 for precisely positioning the waveguides 104 of each tab 110 vertically relative to the ferrule body 11. The vertical waveguide alignment structure 210 may be located within horizontal recess 201 and includes a horizontal alignment surface or datum 211 configured to engage the lower surface 113 of each tab 110. A vertically sloped surface 212 extends downward from tip 212 away from the tabs 110. The vertically sloped surface 213 and horizontal alignment surface 211 define an opening 214 configured to receive the mating edge 112 of a tab 110 therein.

Upon sliding the leading edge 123 of tab 110 into the opening 214, an upper corner 115 of the leading edge will engage the vertically sloped surface 213 and force the tab downward so that the lower surface 113 of the tab engages the horizontal alignment surface 211. In some embodiments (e.g., FIG. 1), the horizontal alignment surface 211a associated with the lower support level 30 may be eliminated and the lower surface 113 of the lower tab 110a pressed against the lower surface 25 of ferrule body 11 by the vertically sloped surface 213a. In the embodiment depicted in FIG. 11, the horizontal alignment surface 211a is used to set the vertical position of waveguides 104 of the lower tab 110.

As depicted, the horizontal alignment surface 211 is configured to engage the lower surface 113 of tab 110. Such a structure may be desirable when the waveguides 104 are positioned generally adjacent the lower surface 113. In instances in which the waveguides 104 are positioned generally adjacent the upper surface 114 of tab 110, it may be desirable to invert the vertical waveguide alignment structure 210 so that the horizontal alignment surface 211 engages the upper surface of the tab.

The fixture 200 may further include guide posts 220 (FIGS. 5-6) that interact with the alignment holes 40 of the ferrule body 11 to accurately position the fixture relative to the ferrule body. By doing so, the alignment components such as the angled surfaces 203 and vertical waveguide alignment structure 210 may be precisely and consistently positioned relative to the ferrule body 11. The portions of the fixture 200 that may engage an adhesive during the manufacturing process, such as the horizontal recess 201, the projections 206, and the vertical waveguide alignment structure 210, may be coated with a non-stick material, such as polytetrafluoroethylene or any other desired material, to facilitate removal of the fixture after the adhesive has been cured.

To assemble a multi-tiered optical assembly 50, the tabs 110a-110d are positioned within the opening 20 of ferrule body 11 and subsequently secured with an adhesive such as an ultraviolet curable epoxy. The adhesive may be applied as each tab 110 is positioned within the opening 20 or may be applied after all of the tabs have been mounted within the recess. Cover 45 may be positioned within the opening 20 after all of the tabs 110 have been inserted therein. The adhesive may also be applied adjacent the mating face 12 of the ferrule body 11 and thus may fill the opening 20 to secure the tabs in position.

Prior to curing the adhesive, fixture 200 is positioned so that the guide posts 220 are aligned with the alignment holes 40 of the ferrule body 11. The fixture 200 is moved relative to the ferrule body 11 so that the guide posts 220 slide into the alignment holes 40. As the alignment face 202 approaches the mating edges 112 of tabs 110, the angled alignment surface 121 along each sidewall 111 engages the angled surface 203 of the fixture 200 to position the tabs (and thus waveguides 104) laterally relative to the ferrule body 11. In addition, the upper corner 115 of each mating edge 112 of the tabs 110 engages the vertically sloped surface 213 of the vertical waveguide alignment structure 210 and forces the tabs downward so that the lower surface 113 of each tab engages one of the horizontal alignment surfaces 211 to position the tabs (and thus the waveguides 104) vertically relative to the ferrule body 11.

The adhesive may then be cured to secure the tabs 110 in their desired locations. The fixture 200 may be removed from the ferrule body 11 by sliding the fixture and the guide posts 220 from the alignment holes 40. The mating edge 112 of the tabs 110 together with the mating face 12 of the ferrule body 11 may be polished as desired, such as until planar. The depth of the horizontal recesses 201 and thus the amount that the mating edge 112 that must be polished may be any desired distance. The depth depicted in FIGS. 5-6 is for clarity and not necessarily to scale. In some applications, the recesses 201 may be eliminated depending on the manner in which the multi-tiered optical assembly 50 is terminated or interconnected to another component.

Figure 8:
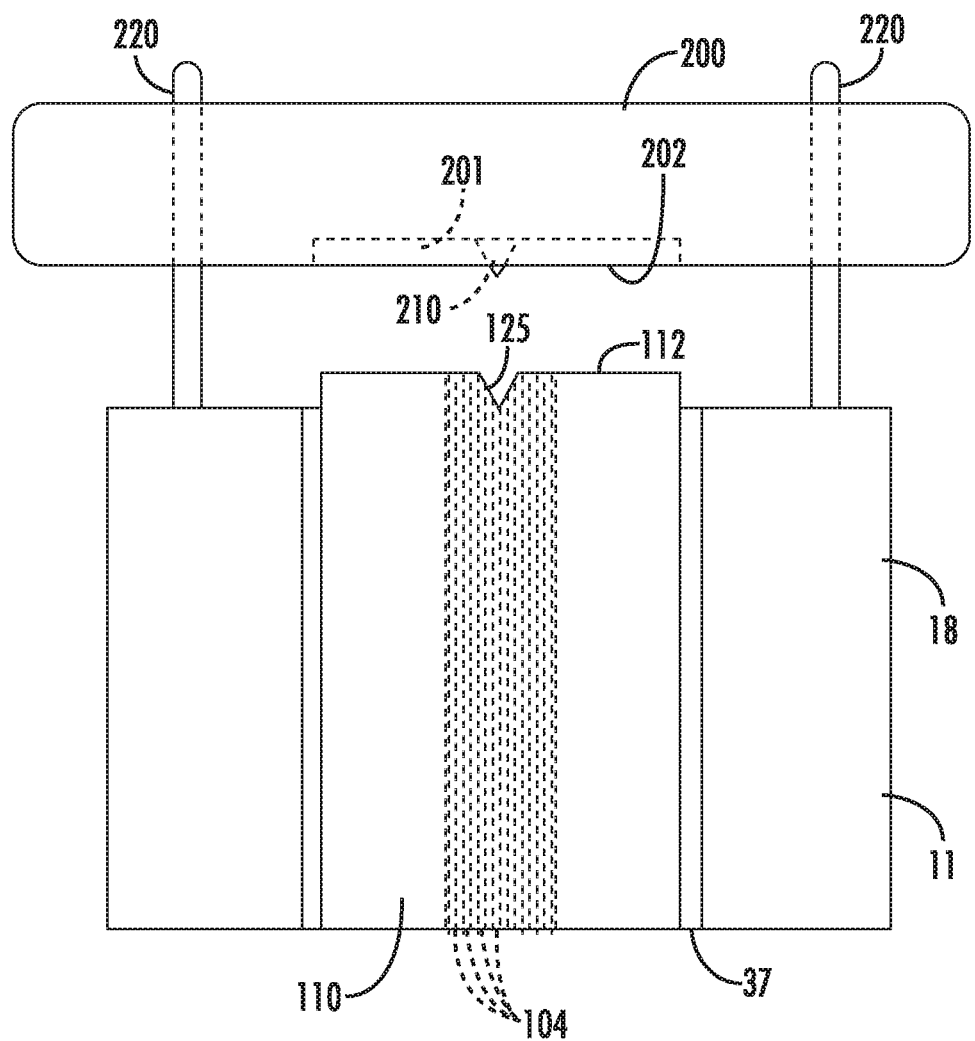
FIG. 8 is a top plan view similar to FIG. 5 but with a second embodiment of a horizontal alignment structure.

Various alternative structures may be utilized, if desired. For example, the recess 201 in the alignment surface 202 may be eliminated or the depth reduced as compared to that depicted in FIGS. 5-6. In such case, the vertical waveguide alignment structure 210 may project into the recess 20 during the assembly process. In another example, the horizontal or lateral alignment may be achieved with an angled or V-shaped groove 125 (FIG. 8) along the mating edge 112 and aligned with the waveguides 104. A similarly shaped V-shaped projection 210 extends from the alignment surface 202. In such case, the mating faces 112 of the tabs 110 are polished after assembly until the V-shaped groove 125 is removed.

Figure 9:
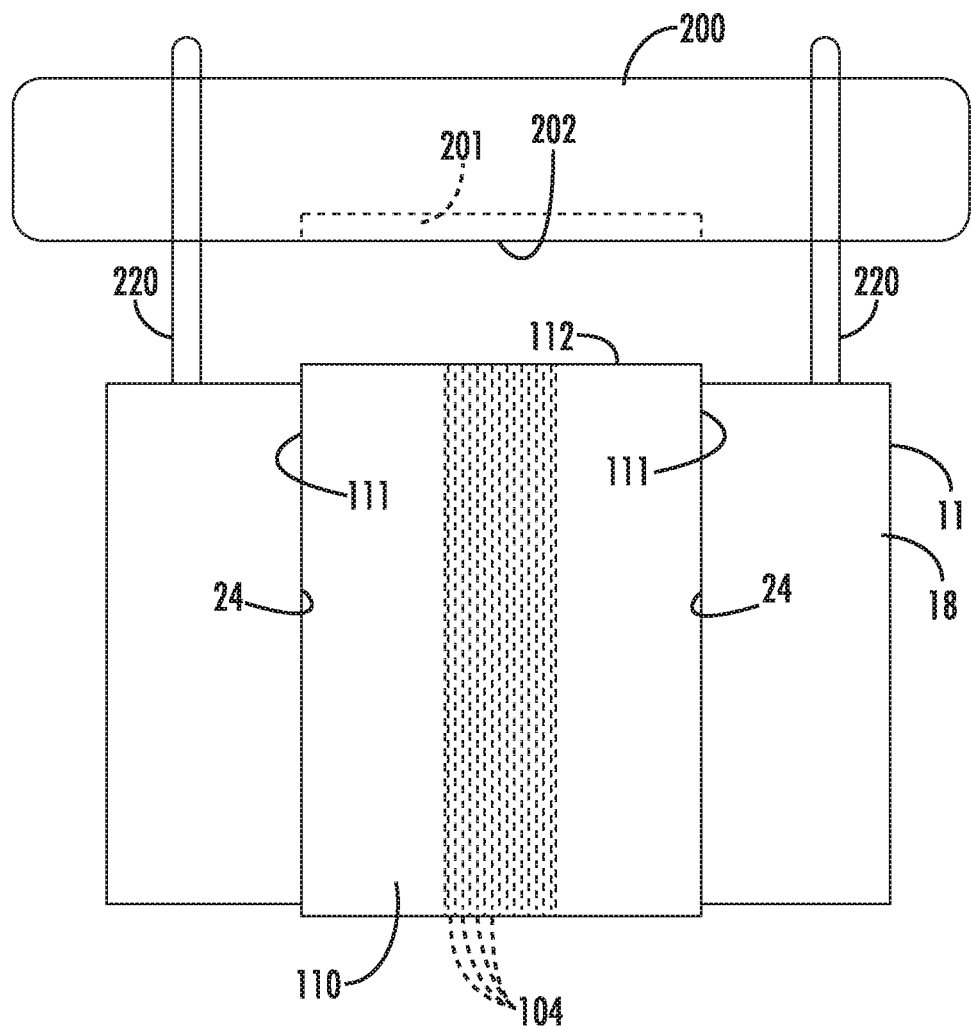
FIG. 9 is a top plan view similar to FIG. 5 but with a third embodiment of a horizontal alignment structure.

In still another example depicted in FIG. 9, one or both of the side surface portions 21-24 at each support level 30-33, respectively, may be precisely positioned and the corresponding sidewall(s) 111 of each tab may be precisely formed or cut so that upon insertion of the tabs into the recess 20, the waveguides 104 are precisely positioned horizontally or laterally relative to the ferrule body 11.

In a further embodiment, the vertical waveguide alignment structure along the alignment face 202 may be configured as a horizontal V-groove or channel (not shown) aligned with each tab 110. More specifically, the horizontal alignment surface or datum 211 may be replaced with another sloped surface (not shown) that converges towards the vertically sloped surface 125 to define a horizontal V-groove. Upon sliding the leading edge 123 of tab 110 into the opening of the V-groove, the leading edge will engage the angled surfaces of the V-groove to position the tab at the desired vertical location.

In still another embodiment, a multi-tiered optical assembly 150 may include a waveguide alignment structure 155 for horizontally and vertically positioning the tabs 110 and their waveguides 104 that is formed as part of a lens plate 160 (FIG. 10) that is mounted to the mating face 12 of ferrule body 11. The lens plate 160 may be generally rectangular with a front face 161 and an oppositely facing rear face 162. The rear face 162 is positioned adjacent the mating face 12 of the ferrule body 11. A recess 163 may be centrally located in the front face 161 and includes a plurality of lens elements 164. One lens elements 164 is aligned with the mating edge of each waveguide 104. The lens elements 164 may be configured as collimating or cross-focusing.

The rear face 162 of lens plate 160 may also include the waveguide alignment structure 155 for horizontally and vertically positioning the tabs 110 and their waveguides 104. In one embodiment, the waveguide alignment structure 155 may be similar or identical to that described above with respect to fixture 200. More specifically, the rear face 162 may be positioned generally adjacent the mating edge 112 of each tab 110. As depicted, the mating edge 112 of tab 110 extends past the mating face 12 of ferrule body 11 and the rear face 162 of lens plate 160 includes a horizontal recess 165 to receive the mating edge 112. In another embodiment, the mating edge 112 of tab 110 may be generally aligned with the mating face 12 of the ferrule body 10 and the recess 165 in the lens plate 160 eliminated.

Figure 7:
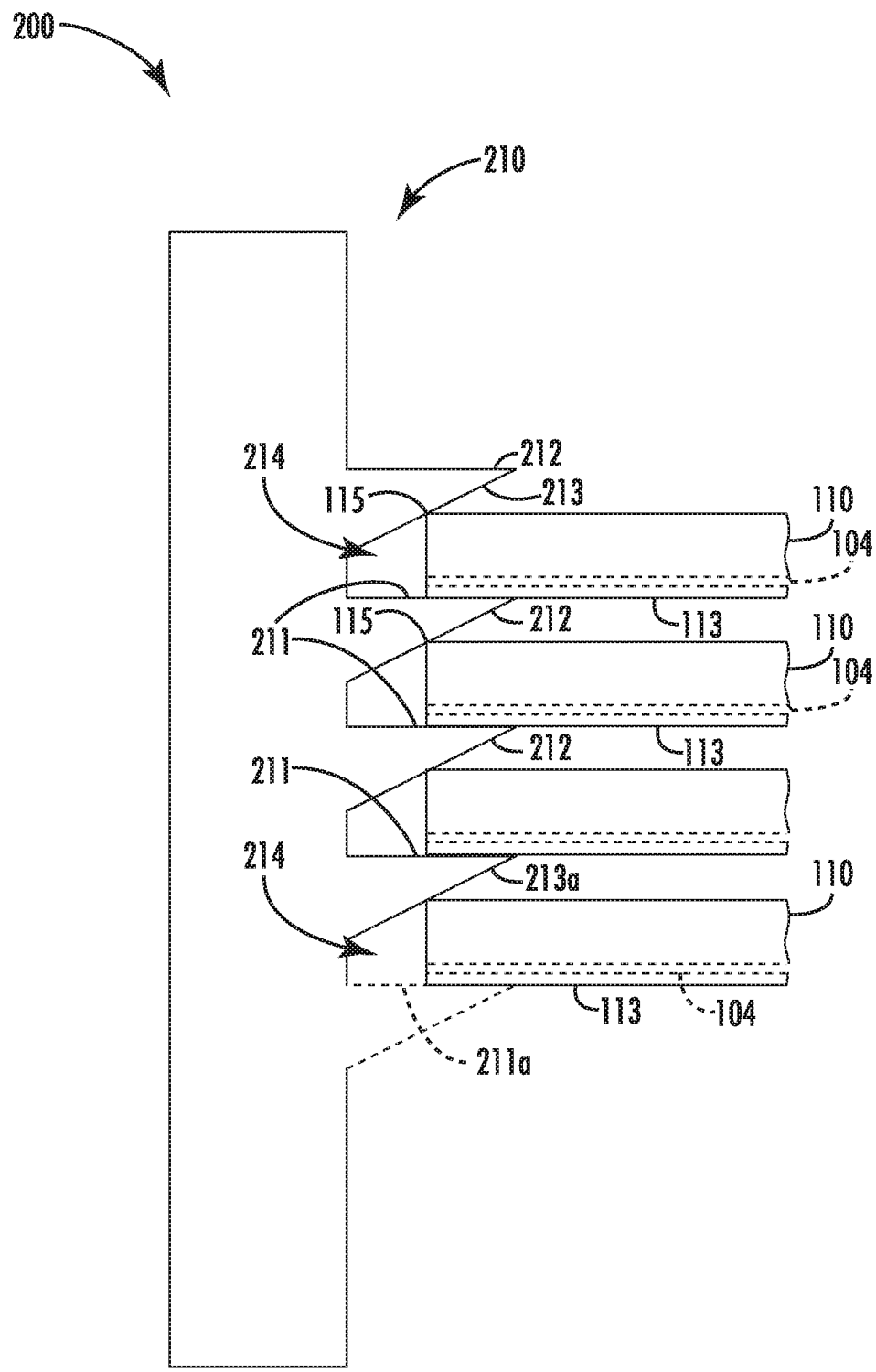
FIG. 7 is a side view of a schematic illustration of a portion of the alignment fixture engaging a plurality of tabs of optical waveguide members to provide for vertical alignment thereof.

Angled surface 166 is defined by the lateral edges 167 of each recess 165 and the inner surfaces 168 of projections 169 that are adjacent the lateral edges. The angled alignment surfaces 121 of each tab 110 interact with the angled surfaces 166 of the lens plate 160 to laterally align the tabs relative to the ferrule body 11. The lens plate 160 may further include a vertical waveguide alignment structure such as that depicted in FIG. 7.

A pair of cylindrical guide holes or receptacles 170 may extend through lens plate 160 and be configured to receive a guide post (not shown) therein to align the guide holes with the alignment holes 40 of ferrule body 11 and thus position the alignment structures of the lens plate relative to the ferrule body 11 and align the mating edges of the optical waveguides 104 relative to the ferrule body 11 and the lens plate 160. A gap (not shown) between the mating edges of the waveguides 104 and the lens plate 160 may be filled with refractive index matching material.

The lens plate 160 may be formed of an optical grade resin or polymer that is capable of being injection molded. In one example, the refractive index of the lens plate 160 may closely match that of the waveguides 104. In other embodiments, the refractive index of the lens plate 160 may match that of a mating component (not shown) or may be set at some other value.

Figure 10:
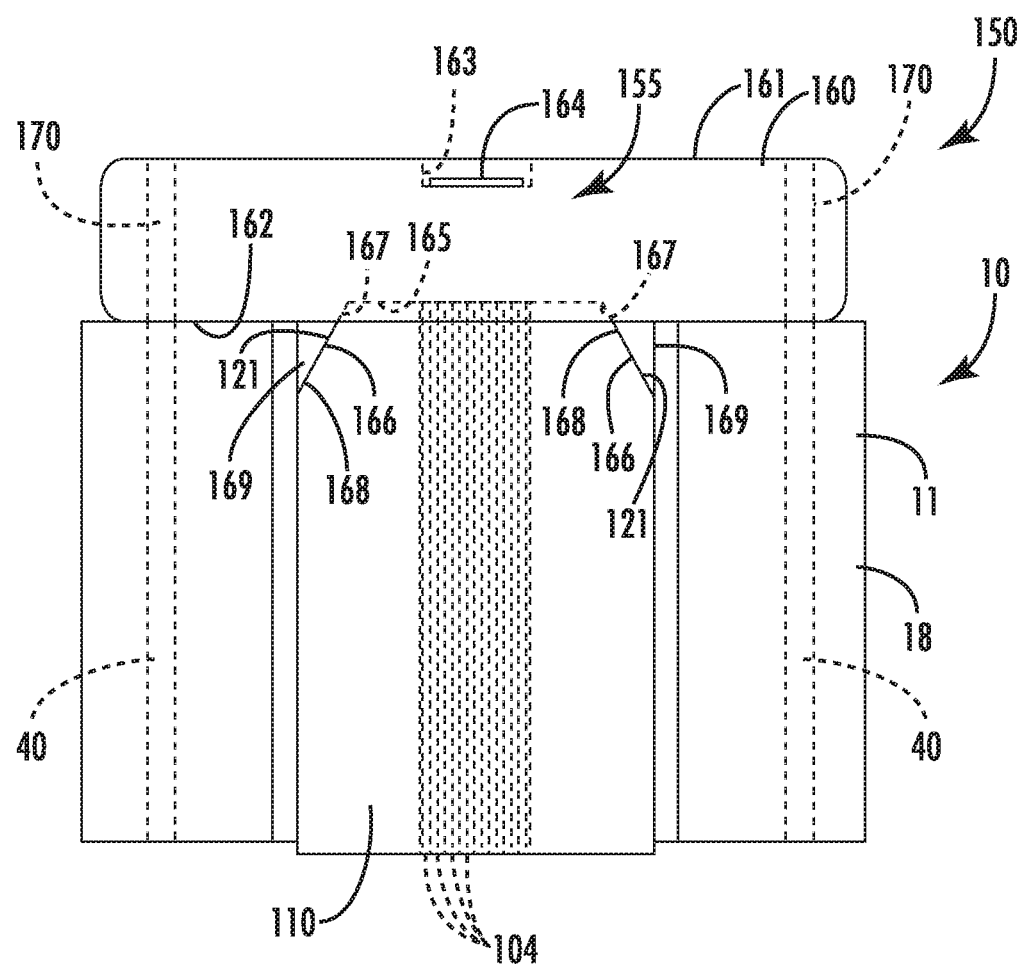
FIG. 10 is a top plan view of a schematic illustration of a multi-tiered optical assembly including a beam expanding element with an integrally formed waveguide alignment structure.
Figure 11:
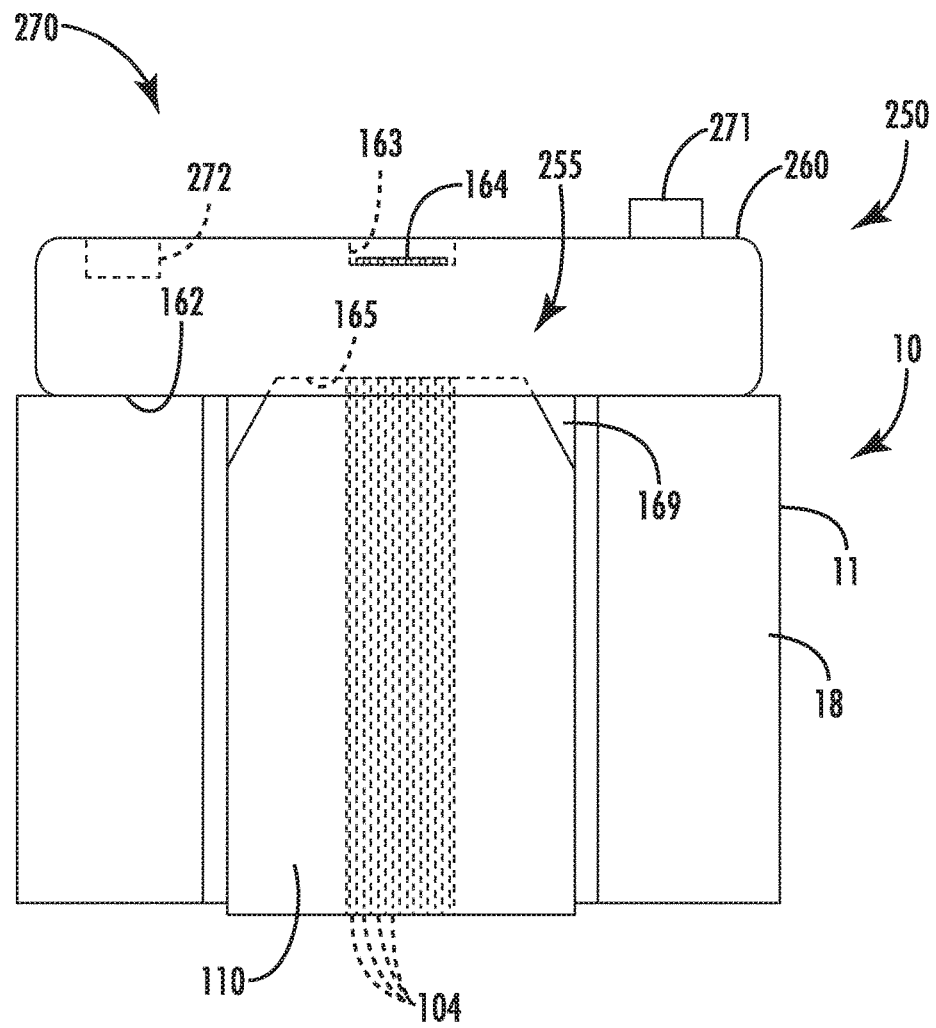
FIG. 11 is a top plan view of a schematic illustration of a multi-tiered optical assembly similar to FIG. 10 but with a second embodiment of a module alignment structure.

Referring to FIG. 11, another embodiment of a multi-tiered optical assembly 250 having a lens plate 260 with an integral waveguide alignment structure 155 is depicted. Such embodiment may be identical or similar to that depicted in FIG. 10 but includes an alternate mating alignment structure 270 for aligning mating assemblies. In the multi-tiered optical assembly 250, the alignment holes 40 may be eliminated from the ferrule body 11 as are the guide holes 170 from the lens plate 60. More specifically, the lens plate 260 includes a hermaphroditic mating alignment structure 270 with a cylindrical projection 271 extending from the front face 161 of the lens plate and a similarly configured opening or recess 272 aligned in the front face but on the laterally opposite side of the recess 163 and lens elements 164. In other words, the projection 271 and the recess 272 are symmetrically positioned relative to the lens elements 164 so that an identically configured mating multi-tiered optical assembly or another component with the same hermaphroditic mating alignment structure 270 will be properly aligned and mate with the lens plate 260. Although depicted with the projection 271 and the opening 272 being cylindrical in shape, the projection and opening may be any complimentary shape.

Since the lens plate 260 is molded as a one-piece member, the hermaphroditic mating alignment structure 270 of the lens plate includes both the waveguide alignment structure 155 and the mating alignment structure 270. As result, the waveguides 104 and the tabs 110 do not need to be aligned relative to the ferrule body 11 which may simplify the manufacturing process by reducing the number of components that must be aligned and increasing the precision of the assembly by reducing tolerance stack-up.

Although the embodiments of FIGS. 10-11 are depicted with the lens plate 160, 260 being formed as a separate component from the ferrule body 11, in another embodiment the lens plate may be integrally formed with the ferrule body.

Figure 12:
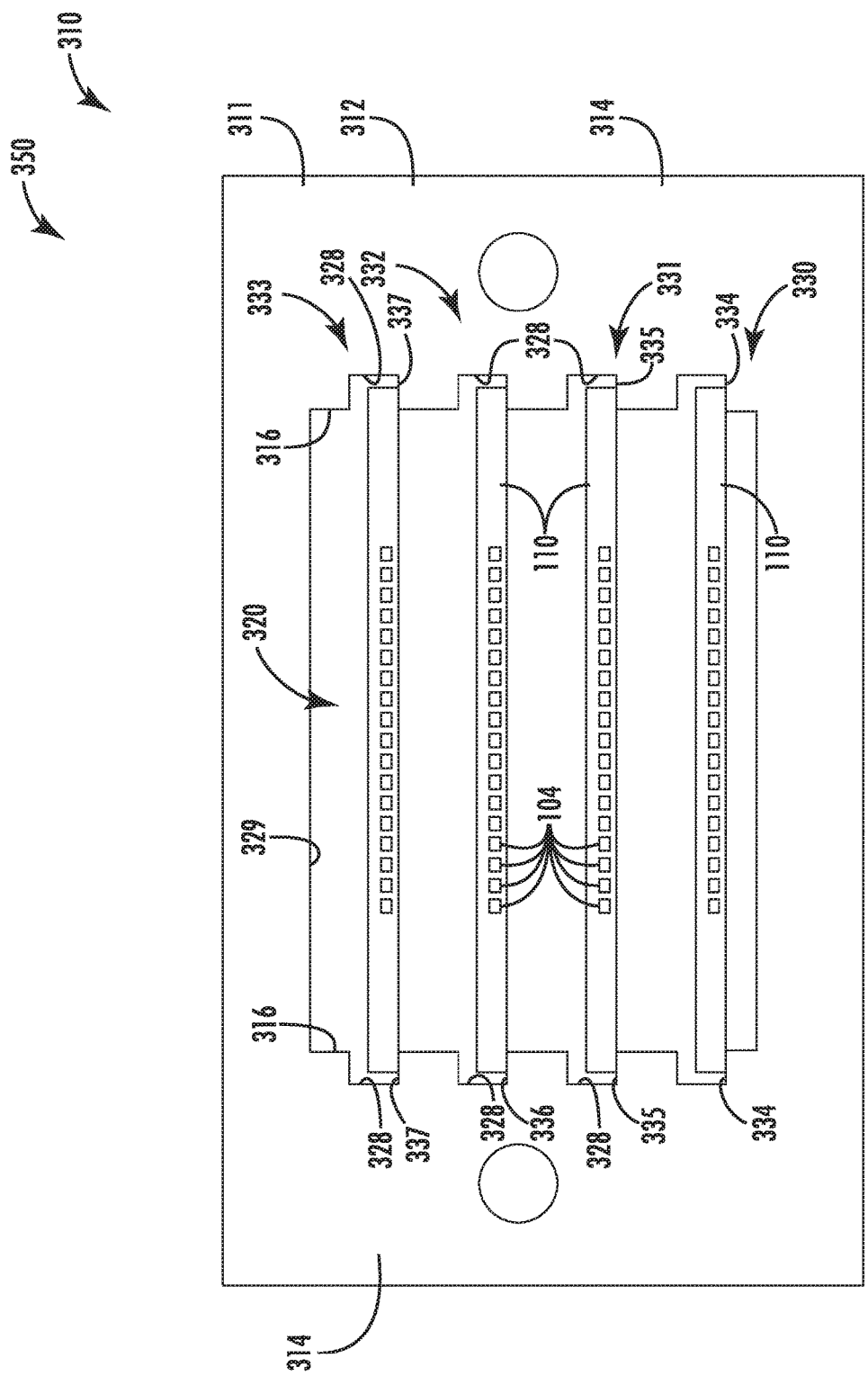
FIG. 12 is a front view of a schematic illustration of a second embodiment of a multi-tiered optical assembly.

Still another embodiment of a multi-tiered optical assembly 350 is depicted in FIG. 12. Multi-tiered optical assembly 350 includes a plurality of tabs 110 with each tab having an identical width. Otherwise, the tabs 110 are identical to those describe above and the description thereof is not repeated herein.

Multi-tiered optical assembly 350 also includes a ferrule 310 having a body 311 with sidewalk 314. The inner surface 316 of each sidewall 314 is generally vertical and includes a plurality of vertically aligned, laterally outwardly extending grooves 328. Each pair of horizontally aligned groove 328 defines a support level 330-333 to receive one of the tabs 110. Each groove 328 defines a support surface 334-337 upon which a tab 110 may be disposed. The inner surfaces 316 of the sidewalls, lower surface 325, and upper surface 329 define opening 320 into which the tabs 110 extend. Opening 320 is depicted without an open upper surface but may include such a configuration and a cover (not shown) to seal the opening if desired.

To assemble the multi-tiered optical assembly 350, each tab 110 is aligned with and inserted into one of the grooves 328 from the rear face (not shown) of ferrule body 311 and towards the mating face 312. Other aspects and manners of assembly as described above may be applied to the multi-tiered optical assembly 350 and are not repeated herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A multi-tiered optical assembly comprising:
   a ferrule body having
      a mating face,
      a rear face,
      a pair of spaced apart sidewalls, each of the spaced apart sidewalls forming a staircase shape,
      the mating face, the rear face, and the sidewalls defining an opening,
      a first support level of a plurality of support levels, the first support level being narrowest and lowest of the plurality of support levels within the ferrule body, and
      a second support level of the plurality of support levels, the second support level positioned above the first support level and wider than the first support level, the second support level being vertically spaced from the first support level; and
   first and second flexible waveguide members, each waveguide member including at least one waveguide, the first waveguide member being disposed at the first support level and extending between the mating face and the rear face, and the second waveguide member being disposed at the second support level and extending between the mating face and the rear face.

2. The multi-tiered optical assembly of claim 1, wherein the second support level includes a pair of spaced apart second support surfaces, each second support surface extending generally along each sidewall, the second waveguide member being disposed on the second support surfaces.

3. The multi-tiered optical assembly of claim 2, wherein the first support level includes a pair of spaced apart first support surfaces, each first support surface extending generally along one of the sidewalls, the first support surfaces being spaced from a lower surface of the opening.

4. The multi-tiered optical assembly of claim 2, wherein the opening includes a lower surface, the lower surface of the opening being coplanar with the first support level.

5. The multi-tiered optical assembly of claim 1, wherein the sidewalls extend between the mating face and the rear face.

6. The multi-tiered optical assembly of claim 1, further including a horizontal alignment structure to position the at least one waveguide of each of the first and second flexible optical waveguide members at desired locations.

7. The multi-tiered optical assembly of claim 6, wherein the first support level includes a pair of spaced apart first side surface portions, the second support level includes a pair of spaced apart second side surface portions, the first optical waveguide member having oppositely facing first side edges, the second optical waveguide member having oppositely facing second side edges, one first side edge engaging one of the first side surface portions, and one second side edge engaging one of the second side surface portions.

8. The multi-tiered optical assembly of claim 1, wherein each optical waveguide member has a mating edge, the mating edge of each optical waveguide member being disposed generally adjacent the mating face of the ferrule body.

9. The multi-tiered optical assembly of claim 1, wherein each optical waveguide member has a mating edge, and further including a beam expanding element adjacent the mating face of the ferrule body, the beam expanding element including a lens member aligned with each waveguide, the beam expanding element including a vertical alignment member aligned with the mating edge of the second optical waveguide member.

10. The multi-tiered optical assembly of claim 9, wherein the vertical alignment member includes at least one angled surface, the mating edge of the second optical waveguide member engaging the angled surface.

11. The multi-tiered optical assembly of claim 10, wherein the vertical alignment member further includes a horizontal surface, the second optical waveguide member being disposed on the horizontal surface.

12. The multi-tiered optical assembly of claim 11, further including a horizontal alignment structure to precisely position the at least one waveguide of each of the first and second flexible optical waveguide members.

13. The multi-tiered optical assembly of claim 12, wherein a portion of the horizontal alignment structure is disposed on the beam expanding element.

14. The multi-tiered optical assembly of claim 9, wherein the beam expanding element is integrally formed with the ferrule body.

15. A method of forming a multi-tiered optical assembly comprising:
   providing a ferrule body having a mating face, a rear face, a pair of spaced apart sidewalls, each of the spaced apart sidewalls forming a staircase shape, the mating face, the rear face, and the sidewalls defining an opening, a first support level of a plurality of support levels, the first support level being narrowest and lowest of the plurality of support levels within the ferrule body, and a second support level of the plurality of support levels, the second support level positioned above the first support level and wider than the first support level, the second support level being vertically spaced from the first support level and vertically spaced from the lower surface of the opening;

providing first and second flexible waveguide members, each waveguide member including at least one waveguide and a mating edge;

positioning the first waveguide member at the first support level and between the mating face and the rear face;

positioning the second waveguide member at the second support level and between the mating face and the rear face;

engaging the first waveguide member adjacent the mating edge thereof to align the at least one waveguide of the first waveguide member relative to the mating face of the ferrule body;

engaging the second waveguide member adjacent the mating edge thereof to align the at least one waveguide of the second waveguide member relative to the mating face of the ferrule body; and securing the first waveguide member and the second waveguide member to the ferrule body.

16. The method of claim 15, wherein the step of engaging each waveguide member adjacent the mating edge thereof includes engaging each waveguide member adjacent the mating edge thereof with an angled surface to vertically position the at least one waveguide of each waveguide member relative to the ferrule body.

17. The method of claim 16, wherein each waveguide member includes an angled horizontal alignment surface and further including engaging the angled horizontal alignment surface to horizontally position the at least one waveguide of each waveguide member relative to the ferrule body.

18. The method of claim 16, further including providing a fixture which includes the angled surface and engaging each waveguide member with the angled surface of the fixture.

19. The method of claim 16, further including providing a beam expanding element which includes the angled surface and engaging each waveguide member with the angled surface of the beam expanding element.

20. A multi-tiered optical assembly comprising:

a ferrule body having a mating face, a rear face, a pair of spaced apart stepped sidewalls, each of the spaced apart sidewalls forming a staircase shape, the mating face, the rear face, and the sidewalls defining an opening, a first support level of a plurality of support levels, the first support level being narrowest and lowest of the plurality of support levels within the ferrule body, the first support level including a pair of spaced apart first side surface portions, the first side surface portions being a first distance apart, and a second support level of the plurality of support levels, the second support level positioned above the first support level and wider than the first support level, the second support level including a pair of spaced apart second side surface portions, the second side surface portions being a second distance apart, the second distance being greater than the first distance, the second support level being vertically spaced from the first support level;

a first flexible optical waveguide member, the first waveguide member having a first mating edge and including at least one first waveguide, the first waveguide member having a first width, the first waveguide member being disposed at the first support level with the first mating edge of the first waveguide member being disposed generally adjacent the mating face of the ferrule body; and a second flexible optical waveguide member, the second waveguide member having a second mating edge and including at least one second waveguide, the second waveguide member having a second width, the second width being wider than the first width, the second waveguide member being disposed at the second support level with the second mating edge of the second waveguide member being disposed generally adjacent the mating face of the ferrule body.

* * * * *